United States Patent [19]
Sato et al.

[11] Patent Number: 5,494,624
[45] Date of Patent: Feb. 27, 1996

[54] CONTROL SYSTEM AND METHOD FOR WIRE INSULATING LINE

[75] Inventors: Hidefumi Sato; Yoshiaki Matsubara, both of Takasago, Japan

[73] Assignee: Kabushiki Kaisha Kobe Seiko Sho, Kobe, Japan

[21] Appl. No.: 253,282

[22] Filed: Jun. 2, 1994

[30] Foreign Application Priority Data

Jun. 2, 1993 [JP] Japan ................... 5-131908

[51] Int. Cl.$^6$ ................................. B29C 47/92
[52] U.S. Cl. ................ 264/40.1; 264/40.5; 264/40.6; 264/40.7; 425/140; 425/141
[58] Field of Search ................... 264/40.1, 40.5, 264/40.6, 40.7, 174; 425/140, 113, 141

[56] References Cited

U.S. PATENT DOCUMENTS

| | | | |
|---|---|---|---|
| 3,635,620 | 1/1972 | Brown | 425/140 |
| 3,896,198 | 7/1975 | Utumi et al. | 264/40.1 |
| 4,174,236 | 11/1979 | Dougherty et al. | 425/140 |
| 4,359,436 | 11/1982 | Henderson et al. | 425/113 |
| 4,585,603 | 4/1986 | Furuta et al. | 425/113 |
| 4,592,881 | 6/1986 | Kyriakis | 425/140 |
| 4,744,930 | 5/1988 | Twist et al. | 425/140 |
| 5,169,649 | 12/1992 | Sikora et al. | 264/40.7 |
| 5,249,427 | 10/1993 | Ikegami et al. . | |
| 5,251,834 | 10/1993 | Ikegami et al. . | |

FOREIGN PATENT DOCUMENTS

| | | |
|---|---|---|
| 59-189510 | 10/1984 | Japan . |
| 60-175317 | 9/1985 | Japan ................... 425/140 |
| 3-118134 | 5/1991 | Japan ................... 425/113 |
| 3216920 | 9/1991 | Japan . |
| 3236120 | 10/1991 | Japan . |

*Primary Examiner*—Jeffery R. Thurlow
*Attorney, Agent, or Firm*—Oblon, Spivak, McClelland, Maier, & Neustadt

[57] ABSTRACT

An insulator composition of foamed synthetic resin is supplied to an extruder 3, and the synthetic resin is extruded onto a wire 4a continuously supplied to the extruder 3 at a temperature higher than or equal to a foaming temperature, to cover the wire 4a with the insulator composition. Then, the wire 4a covered with the insulator composition is solidified by cooling in a water-cooling trough 6 movable towards and away from the extruder 3 in a direction of supply of the wire 4a. In this operation, an outer diameter D and a capacitance C of the insulator composition are controlled such that when the water-cooling trough 6 reaches its movable limit, either a deviation ΔD of a detection value of the outer diameter D from its target preset value or a deviation ΔC of a detection value of the capacitance C from its target preset value is selected as a deviation (ΔD or ΔC) that may first exceed a tolerance range upon changing an amount of supply of the insulator composition to the extruder 3, and then the amount of supply is controlled so that the other deviation (ΔC or ΔD) is decreased under the condition where the selected deviation (ΔD or ΔC) falls within the tolerance.

6 Claims, 4 Drawing Sheets

CONTROL SYSTEM AND METHOD FOR WIRE INSULATING LINE

BACKGROUND OF THE INVENTION

1. Field of the Invention

The present invention relates to a control system and method for a wire insulating line, and more particularly to a control system and method for a wire insulating line for manufacturing a covered wire by covering a wire with an insulator composition of foamed synthetic resin.

2. Description of the Prior Art

A covered wire produced by a wire insulating line is used as a communication means for telephone equipment and general electrical equipment. A high precision of finish specifications of electric characteristics of the covered wire such as capacitance and an outer diameter is required.

On the other hand from a viewpoint of productivity, a high drawing speed of the covered wire is required, and it is also required to raise a drawing speed to higher than or equal to 2000 m/min in a short time after starting of the production line and to make the finished outer diameter and capacitance of the covered wire to fall within a tolerance range soon after starting of the production line.

FIG. 3 is a schematic diagram of such a wire insulating line 1 and FIG. 4 is a flowchart showing a conventional control method for the wire insulating line 1.

In the wire insulating line 1 shown in FIG. 3, a stock wire 4b stored in a coil stocker 12 is reduced in diameter by a drawing machine 10 and is supplied as a core (wire) 4a to an annealer 11, in which the wire 4a is annealed. On the other hand, a synthetic resin such as polyethylene resin and an organic foaming material are supplied to an extruder 3 and are forced into a crosshead 2 provided at the end of a cylinder (not shown) of the extruder 3 by means of a screw (not shown) built in the cylinder.

The polyethylene resin and the organic foaming material are heated to a predetermined temperature higher than or equal to a decomposing temperature of the organic foaming material by means of a heater (not shown) provided in the crosshead 2.

Then, the wire 4a which is maintained at a suitable temperature is introduced into the crosshead 2 of the extruder 3, and is covered with the polyethylene resin to form a covered wire 4 having the same shape as the inner shape of the crosshead 2. Then, the covered wire 4 is hauled in a direction shown by an arrow F by a haul off machine 9 and is immersed into water in a water-cooling trough 6, in which the covered wire 4 is solidified by cooling. Thereafter, a capacitance C of the covered wire 4 is measured by a capacitance monitor 7, and an outer diameter D of the covered wire 4 is then measured by an outer diameter monitor 8.

In the wire insulating line 1 mentioned above, variables such as rotational speed of the screw in the extruder 3, etc. are controlled in proportion to a haul off speed V of the haul off machine 9 to obtain desired values of the capacitance and the outer diameter of the covered wire 4 as shown in FIG. 4 (S01).

The capacitance C of the covered wire 4 is adjusted according to its measured value by using a moving trough 5 to move the water-cooling trough 6 away from the extruder 3 in the drawing direction (S02 and S03). In other words, the adjustment of the capacitance C is effected by changing a distance between the extruder 3 and the water-cooling trough 6 (i.e., changing a position L of the water-cooling trough 6 within a control range of L0 to L1) to thereby adjust a period of time from covering of the polyethylene resin to solidification thereof and hence control a degree of foaming of the polyethylene resin. Further, the outer diameter D of the covered wire 4 is adjusted according to its measured value by either automatically or manually changing a rotational speed N of the screw of the extruder 3 and a set temperature θ of the extruder 3 (Japanese Patent Laid-open No. Hei 3-236120, for example).

In this manner, the outer diameter D and the capacitance C of the covered wire 4 are controlled by adjusting a supply amount of the resin, a cooling rate of the covered wire 4, and a temperature of the resin supplied.

However, the above conventional control method for the wire insulating line 1 has the following problem.

A delay time and a response time associated with the control of the resin temperature are considerably longer than those associated with both the control of the resin supply amount and the control of the cooling rate of the covered wire (the times for the latter are of the order of second, whereas the times for the former are of the order of minute). Further, there is a limit to the controllable range (moving range) in the control of the cooling rate of the covered wire 4 by the movement of the water-cooling trough 6. Accordingly, when the required control of the cooling rate is outside the controllable range as may occur during starting of the production line or upon a change of surroundings, the product cannot possibly be taken out until the foaming degree of the resin falls within a proper range under the control of the resin temperature.

SUMMARY OF THE INVENTION

It is accordingly an object of the present invention to provide a control system and method for a wire insulating line which can always ensure the quality stability of products even when the production line is in an unstable condition such as at start-up of the production line.

According to the present invention, in a control system and method for a wire insulating line wherein an insulator composition of synthetic resin supplied to an extruder is extruded onto a wire continuously supplied to the extruder to cover the wire with the insulator composition, the wire covered with the insulator composition is then solidified by cooling, and an outer diameter and a capacitance of the insulator composition are controlled to predetermined values; one of a deviation of a detection value of the outer diameter from the target value of the outer diameter and a deviation of a detection value of the capacitance from the target value of the capacitance is selected as a deviation to be decreased when a cooler movable in a direction of supply of the wire for cooling the wire reaches its moving limit, and a supply amount of the insulator composition is controlled so that the deviation selected above falls within a tolerance range and the other deviation is decreased.

Preferably, the supply amount of the insulator composition is controlled by controlling a rotational speed of a screw provided in a cylinder of the extruder.

With this construction, the outer diameter and the capacitance of the insulator composition are controlled in association with each other to thereby quickly improve the quality of the covered wire to a desired level. Further, even upon starting of the production line where the range of required control of the cooling rate is outside the controllable range because of fluctuations of physical properties of the foamed resin and characteristics of the extruder to cause a delay of temperature control and an unstable condition of the production line, the quality stability of the products can always be ensured.

DETAILED DESCRIPTION OF THE PREFERRED EMBODIMENTS

There will now be described a preferred embodiment of the present invention with reference to the accompanying drawings. It is to be noted that the following embodiment is merely illustrative and does not limit the technical scope of the present invention.

Figure 1:
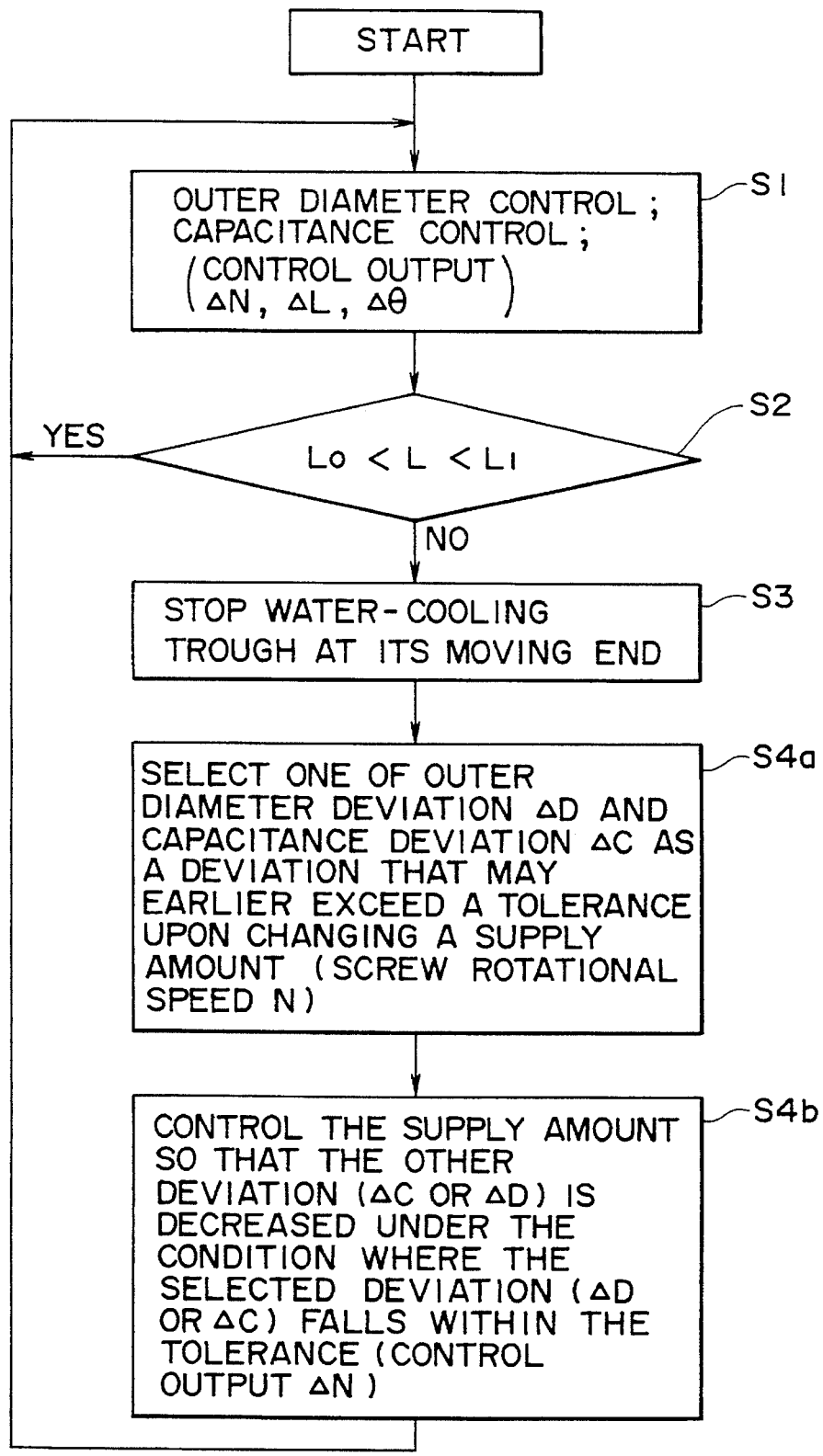
FIG. 1 is a flowchart showing a control method for a wire insulating line according to a preferred embodiment of the present invention.
Figure 2:
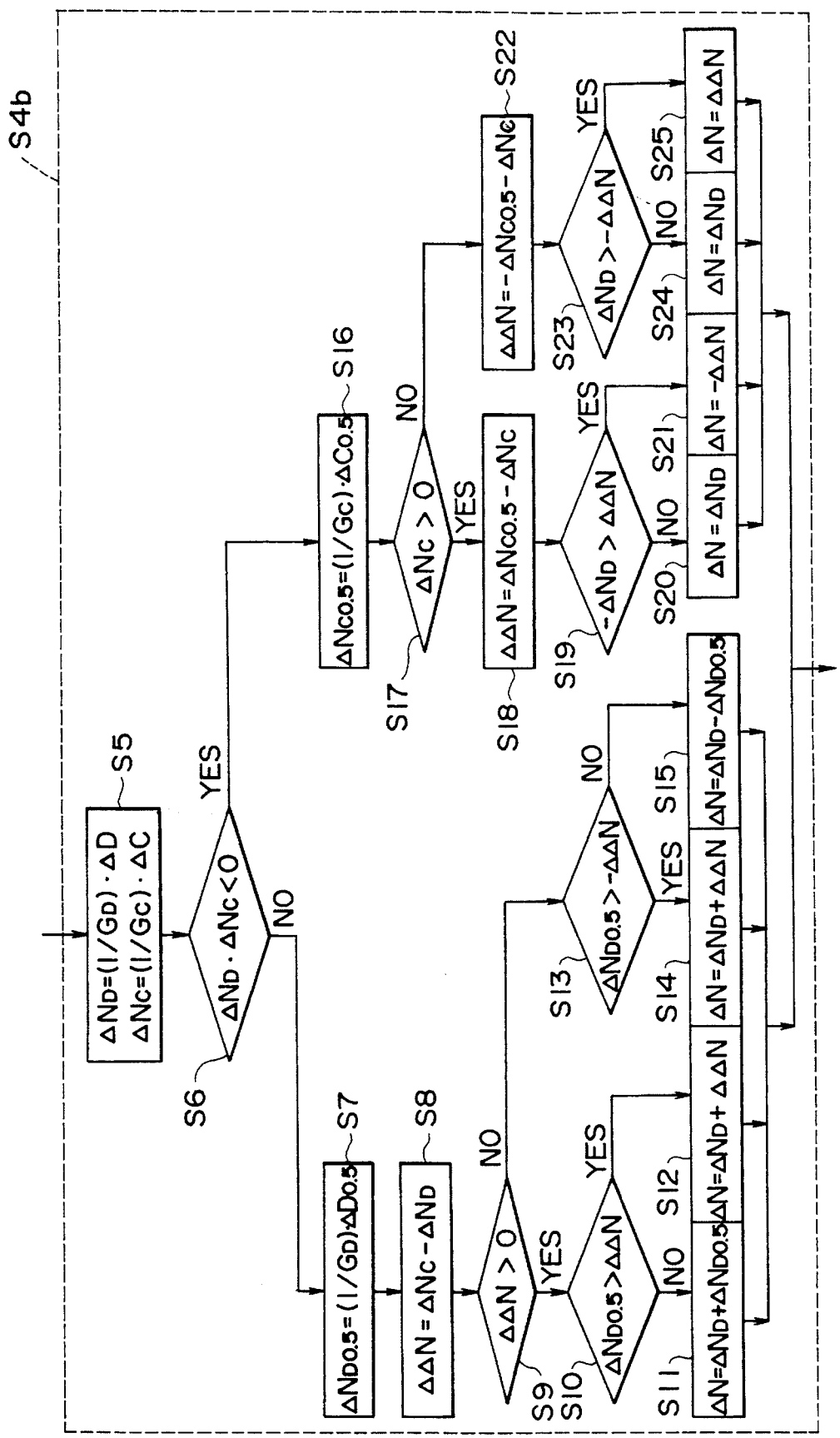
FIG. 2 is a flowchart showing the detail of step S4b shown in the flowchart of FIG. 1.

FIG. 1 is a flowchart showing a control method for a wire insulating line 1 according to the preferred embodiment of the present invention; FIG. 2 is a flowchart showing the detail of step S4b shown in the flowchart of FIG. 1; and FIG. 3 is a schematic diagram of the wire insulating line 1 (this drawing is used commonly for the description of the prior art for convenience).

Figure 3:
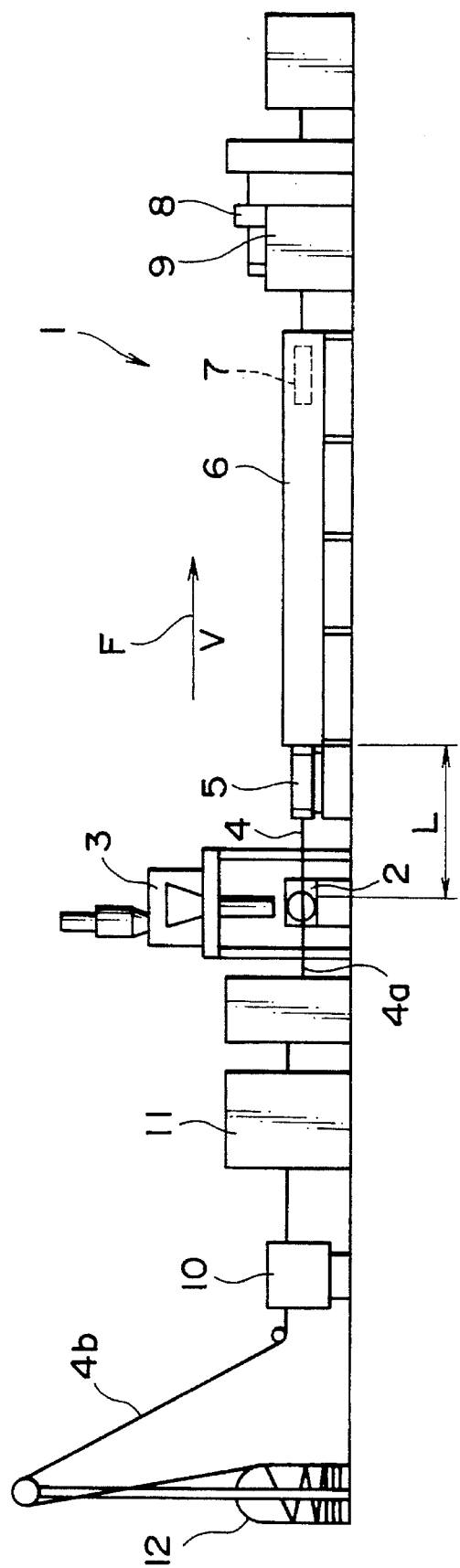
FIG. 3 is a schematic diagram of the wire insulating line.
Figure 4:
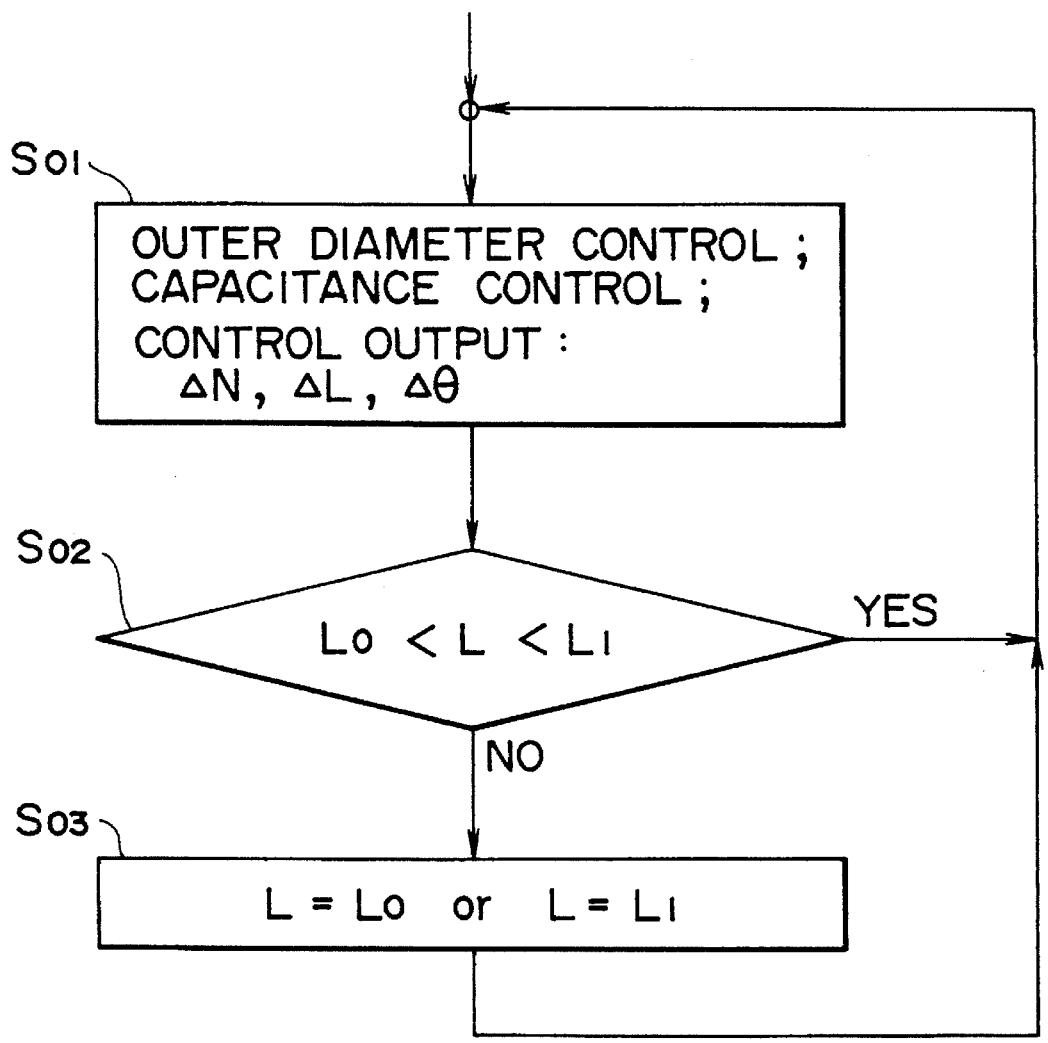
FIG. 4 is a flowchart showing a conventional control method for the wire insulating line.

As shown in FIGS. 1 and 3, the control method for the wire insulating line 1 according to the preferred embodiment is similar to that in the prior art in the following respect. That is, an insulator composition of foamed synthetic resin is supplied to an extruder 3, and the synthetic resin is extruded onto a core (wire) 4a continuously supplied to the extruder 3 as being heated by a heater (not shown) provided in a crosshead 2 of the extruder 3 and maintained at a temperature higher than or equal to a foaming temperature, thereby covering the wire 4a to obtain a covered wire 4. Then, the covered wire 4 is solidified by cooling in a water-cooling trough 6 (corresponding to the cooler in the invention) movable towards and away from the extruder 3 in a direction of supply of the wire 4a by a moving trough 5. In this operation, an outer diameter D and a capacitance C of the insulator composition are controlled so that a detection value of the outer diameter D measured by a diameter monitor 8 and a detection value of the capacitance C measured by a capacitance monitor 7 become respective predetermined values. However, the control method according to the preferred embodiment is different from that in the prior art in the following respect. That is, when the water-cooling trough 6 reaches its movable limit, either a deviation $\Delta D$ of the detection value of the outer diameter D by the diameter monitor 8 from the target preset value or a deviation $\Delta C$ of the detection value of the capacitance C by the capacitance monitor 7 from the target preset value is selected as a deviation to be decreased (for example, one of the deviations $\Delta D$ and $\Delta C$ is selected as a deviation that may first exceed a tolerance upon changing an amount of supply of the insulator composition to the extruder 3). Then, the amount of supply is controlled so that the non-selected deviation ($\Delta C$ or $\Delta D$) is decreased under the condition where the selected deviation ($\Delta D$ or $\Delta C$) falls within the tolerance.

The following description of the preferred embodiment will be directed primarily to that part differing from the prior art, and the detailed description relating to the remaining part similar to that in the prior art will be omitted because it is previously described.

Now, the control method according to the preferred embodiment will be described in more detail with reference to FIGS. 1 and 2.

Referring first to FIG. 1, the control of the outer diameter D and the capacitance C of the insulator composition covering the wire 4a is basically performed by adjusting a supply amount of the resin, a cooling amount of the covered wire 4, and a temperature of the resin supplied as similar to the prior art (S1). Control outputs at this time are a fluctuation $\Delta N$ of a rotational speed N of a screw (not shown) built in a cylinder (not shown) of the extruder 3, a fluctuation $\Delta L$ of a distance L from an outlet of the crosshead 2 provided at the end of the cylinder to the water-cooling trough 6, and a fluctuation $\Delta \theta$ of a heating temperature $\theta$ of the heater provided in the crosshead 2. If the desired position L of the water-cooling trough 6 falls within a control range (L0 to L1), the control of step S1 is repeated (S2). However, if the desired position L is outside the control range, the water-cooling trough 6 comes to be positioned at one of opposite moving limits (L0 or L1) and stops at this position (S3). Then, in this preferred embodiment, one of the deviation $\Delta D$ of the outer diameter and the deviation $\Delta C$ of the capacitance is selected as a deviation that may first exceed a predetermined tolerance range upon changing the rotational speed N of the screw (S4a). Then, the control output $\Delta N$ is calculated so that the other deviation ($\Delta C$ or $\Delta D$) is minimized under the condition where the selected deviation ($\Delta D$ or $\Delta C$) falls within the tolerance range (S4b). The control in step S4b will be described in more detail with reference to FIG. 2 in the case where the deviation $\Delta D$ of the outer diameter is selected as the deviation that may first exceed the tolerance. If the deviation $\Delta C$ of the capacitance is selected as the deviation that may first exceed the tolerance, fluctuations $\Delta ND$ and $\Delta ND(0.5)$ relating to the deviation $\Delta D$ of the outer diameter shown in FIG. 2 can be replaced by fluctuations $\Delta NC$ and $\Delta NC(0.5)$ relating to the deviation $\Delta C$ of the capacitance.

Referring to FIG. 2, fluctuations $\Delta ND$ and $\Delta NC$ of the rotational speed of the screw of the extruder 3 are obtained from the outer diameter deviation $\Delta D$ and capacitance deviation $\Delta C$, respectively (S5). Then in step S6, the directions of the rotational speed fluctuations $\Delta ND$ and $\Delta NC$ are checked. If the directions of the rotational speed fluctuations $\Delta ND$ and $\Delta NC$ are the same as each other (S6: No), the control is performed so that the outer diameter deviation $\Delta D$ does not exceed the tolerance range. To this end, a rotational speed fluctuation $\Delta ND(0.5)$ is obtained (S7). The rotational speed fluctuation $\Delta ND(0.5)$ is the fluctuation when the outer diameter deviation $\Delta D$ is 0.5% of the predetermined value (0.5% represents a safety limit). Then, a deviation $\Delta \Delta N$ between the rotational speed fluctuation $\Delta ND$ corresponding to the outer diameter deviation $\Delta D$ and the rotational speed fluctuation $\Delta NC$ corresponding to the capacitance deviation $\Delta C$ is obtained (S8). If the deviation $\Delta \Delta N$ is positive (S9: Yes), the rotational speed fluctuation $\Delta NC$ corresponding to the capacitance deviation $\Delta C$ is dominant. Then in step S10, the deviation $\Delta \Delta N$ and the rotational speed fluctuation $\Delta ND(0.5)$ corresponding to the outer diameter deviation $\Delta D(0.5)$ at the safety limit of 0.5% is compared. If the rotational speed fluctuation $\Delta ND(0.5)$ is not greater than the deviation $\Delta \Delta N$ (S10: No), the rotational speed fluctuation $\Delta ND(0.5)$ providing a smaller change is added to the rotational speed fluctuation $\Delta ND$ to obtain an output value $\Delta N$ (S11). If the rotational speed fluctuation $\Delta ND(0.5)$ is greater than the deviation $\Delta\Delta N$ (S10: Yes), the deviation $\Delta\Delta N$ providing a smaller change is added to the rotational speed fluctuation $\Delta ND$ to obtain an output value $\Delta N$ (S12). Thus, in both steps S11 and S12, the output value $\Delta N$ is set so that the outer diameter deviation $\Delta D$ is decreased with the outer diameter deviation $\Delta D(0.5)$ set as an upper limit. In this case, since the directions of the rotational speed fluctuations $\Delta NC$ and $\Delta ND$ are the same as each other, the capacitance deviation $\Delta C$ is also decreased. On the other hand, if the deviation $\Delta\Delta N$ is not positive (S9: No), the outer diameter deviation $\Delta D$ is dominant. Then in step S13, the deviation $\Delta\Delta N$ multiplied by $-1$ and the rotational speed fluctuation $\Delta ND(0.5)$ are compared. If the rotational speed fluctuation $\Delta ND(0.5)$ is greater than the deviation $\Delta\Delta N$ multiplied by $-1$ (S13: Yes), the deviation $\Delta\Delta N$ providing a smaller change is added to the rotational speed fluctuation $\Delta ND$ to obtain an output value $\Delta N$ (S14). If the rotational speed fluctuation $\Delta ND(0.5)$ is not greater than the deviation $\Delta\Delta N$ multiplied by $-1$ (S13: No), the rotational speed fluctuation $\Delta ND(0.5)$ providing a smaller change is subtracted from the rotational speed fluctuation $\Delta ND$ to obtain an output value $\Delta N$ (S15). Thus also in both steps S14 and S15, the output value $\Delta N$ as a correction quantity is decided so that the outer diameter deviation $\Delta D$ is decreased with the outer diameter deviation $\Delta D(0.5)$ set as an upper limit. Also in this case, since the directions of the rotational speed fluctuations $\Delta NC$ and $\Delta ND$ are the same as each other, the capacitance deviation $\Delta C$ is decreased.

On the other hand, if the directions of the rotational speed fluctuations $\Delta ND$ and $\Delta NC$ are opposite to each other (S6: Yes), the control is performed so that the capacitance deviation $\Delta C$ does not exceed the tolerance range. To this end, a rotational speed fluctuation $\Delta NC(0.5)$ is obtained (S16). The rotational speed fluctuation $\Delta NC(0.5)$ is the fluctuation when the capacitance deviation $\Delta C$ is 0.5% of the predetermined target value (0.5% represents a safety limit). Then in step S17, it is determined whether or not the rotational speed fluctuation $\Delta NC$ is positive. If the rotational speed fluctuation $\Delta NC$ is positive (S17: Yes), a deviation $\Delta\Delta N$ between the rotational speed fluctuation $\Delta NC(0.5)$ and the rotational speed fluctuation $\Delta NC$ is obtained (S18). In other words, a remaining allowable range of change in the rotational speed is obtained in step S18. Then in step S19, the deviation $\Delta\Delta N$ and the rotational speed fluctuation $\Delta ND$ multiplied by $-1$ are compared. If the rotational speed fluctuation $\Delta ND$ multiplied by $-1$ is not greater than the deviation $\Delta\Delta N$ (S19: No), the rotational speed fluctuation $\Delta ND$ providing a smaller change is set as an output value $\Delta N$ (S20). If the rotational speed fluctuation $\Delta ND$ multiplied by $-1$ is greater than the deviation $\Delta\Delta N$ (S19: Yes), the deviation $\Delta\Delta N$ multiplied by $-1$ providing a smaller change is set as an output value $\Delta N$ (S21). On the other hand, if the rotational speed fluctuation $\Delta NC$ is not positive (S17: No), a deviation $\Delta N$ is obtained by subtracting the rotational speed fluctuation $\Delta NC$ from the rotational speed fluctuation $\Delta NC(0.5)$ multiplied by $-1$ (S22). Also in this case, a remaining allowable range of change in the rotational speed is obtained in step S22. Then in step S23, the deviation $\Delta\Delta N$ multiplied by $-1$ and the rotational speed fluctuation $\Delta ND$ are compared. If the rotational speed fluctuation $\Delta ND$ is not greater than the deviation $\Delta\Delta N$ multiplied by $-1$ (S23: No), the rotational speed fluctuation $\Delta ND$ providing a smaller change is set as an output value $\Delta N$ (S24). If the rotational speed fluctuation $\Delta ND$ is greater than the deviation $\Delta\Delta N$ multiplied by $-1$ (S23: Yes), the deviation $\Delta\Delta N$ providing a smaller change is set as an output value $\Delta N$ (S25). Thus, in all steps S20, S21, S24, and S25, the output value $\Delta N$ as a correction quantity is decided so that the outer diameter deviation $\Delta D$ is decreased with the capacitance deviation $\Delta C(0.5)$ at the significance level of 0.5% as an upper limit. In this case, since the directions of the rotational speed fluctuations $\Delta NC$ and $\Delta ND$ are opposite to each other, the capacitance deviation $\Delta C$ is increased. However, the capacitance deviation $\Delta C$ is controlled to fall below the above upper limit, and there is no problem.

As described above, when the water-cooling trough 6 reaches a limit position in this preferred embodiment, either the deviation $\Delta D$ of the outer diameter of the covered wire or the deviation $\Delta C$ of the capacitance of the covered wire that may first exceed the tolerance upon changing the rotational speed N of the screw of the extruder 3 is determined, and is then controlled to be positively decreased. As a result, easy control such that both the outer diameter deviation $\Delta D$ and the capacitance deviation $\Delta C$ are controlled to fall within the tolerance can be performed.

In the course of this control, temperature control is separately carried out. Accordingly, when the desired position of the water-cooling trough 6 comes within a controllable range again owing to the effect of the temperature control, the above easy control is stopped.

Accordingly, the quality of the covered wire as a product can be early improved to a desired level. Further, even upon starting of the production line where the range of control of the cooling rate is outside a controllable range because of fluctuations of physical properties of the foamed resin and characteristics of the extruder 3 to cause a delay of temperature control and an unstable condition of the production line, the stability of the quality of the products can always be ensured.

While the easy control shown in the flowchart of FIG. 2 employs the control of the outer diameter D as a main routine owing to the fact that the outer diameter D and the rotational speed N are in proportional relationship, the control of the capacitance C (not shown) may be employed as a main routine in actual use. In this case, the outer diameter deviation $\Delta D$ can be minimized, so that the control of the capacitance C as the main routine may be applied depending on the kind of the products.

This invention may be embodied in other various manners without departing from the spirit and scope of the invention. It is therefore to be appreciated that the preferred embodiment mentioned above is merely illustrative in all aspects and is not construed to be restrictive. The scope of this invention is defined by the appended claims, and various modifications and changes belonging to the equivalence to the claims are intended to be all embraced by the claims.

What is claimed is:

1. A control system for a wire insulating line wherein an insulator composition of synthetic resin supplied to an extruder is extruded onto a wire continuously supplied to said extruder to cover said wire with said insulator composition, said wire covered with said insulator composition is then cooled to be solidified, and an outer diameter and a capacitance of said insulator composition are controlled to predetermined values; said control system comprising:

sensors for detecting an outer diameter and a capacitance of the insulator composition;

a cooler movable in a direction of supply of said wire for cooling said wire covered with said insulator composition up to a moving limit;

selecting means for selecting one of a deviation of a detected value of said outer diameter from a desired value and a deviation of a detected value of said capacitance from a desired value as a deviation to be decreased when said cooler reaches the moving limit; and control means for controlling a supply amount of said insulator composition, when said cooler reaches the moving limit, so that said deviation selected by said selecting means falls within a predetermined tolerance range and the non-selected deviation is decreased.

2. A control system for a wire insulating line according to claim 1, wherein said control means comprises means for controlling a rotational speed of a screw mounted in a cylinder of said extruder.

3. A control method for a wire insulating line wherein an insulator composition of synthetic resin supplied to an extruder is extruded onto a wire continuously supplied to said extruder to cover said wire with said insulator composition, said wire covered with said insulator composition is then cooled to be solidified, and an outer diameter and a capacitance of said insulator composition are controlled to predetermined values; said control method comprising:

a first step of moving a cooler in a direction of supply of the wire;

a second step of selecting one of a deviation of a detected value of said outer diameter from a desired value and a deviation of a detected value of said capacitance from a desired value as a deviation to be decreased when said cooler movable in a direction of supply of said wire for cooling said wire covered with said insulator composition reaches a moving limit; and a third step of controlling a supply amount of said insulator composition, when said cooler reaches the moving limit, so that said deviation selected by said selecting falls within a predetermined tolerance range and the non-selected deviation is decreased.

4. A control method for a wire insulating line according to claim 3, wherein said second step comprises a step of controlling a rotational speed of a screw mounted in a cylinder of said extruder.

5. A control method for a wire insulating line according to claim 4, wherein said second step comprises a step of selecting said deviation of said outer diameter when a direction of a fluctuation of said rotational speed of said screw corresponding to said deviation of said outer diameter is the same as a direction of a fluctuation of said rotational speed corresponding to said deviation of said capacitance.

6. A control method for a wire insulating line according to claim 4, wherein said second step comprises a step of selecting said deviation of said capacitance when a direction of a fluctuation of said rotational speed of said screw corresponding to said deviation of said outer diameter is opposite to a direction of a fluctuation of said rotational speed corresponding to said deviation of said capacitance.

* * * * *